United States Patent
Rajan et al.

(10) Patent No.: US 6,906,997 B1
(45) Date of Patent: Jun. 14, 2005

(54) PROTECTION METHOD AND SYSTEM FOR EQUIPMENT IN A NETWORK ELEMENT

(75) Inventors: Raghu Rajan, Dallas, TX (US); Danny Dharamraj, McKinney, TX (US)

(73) Assignee: Fujitsu Limited, Kawasaki (JP)

( * ) Notice: Subject to any disclaimer, the term of this patent is extended or adjusted under 35 U.S.C. 154(b) by 876 days.

(21) Appl. No.: 09/658,165

(22) Filed: Sep. 8, 2000

(51) Int. Cl.⁷ .............................................. G01R 31/08
(52) U.S. Cl. .................... 370/216; 379/399.01
(58) Field of Search ............................... 370/216–228; 379/399.01

(56) References Cited

U.S. PATENT DOCUMENTS 6,332,198 B1 * 12/2001 Simons et al. ................. 714/6
6,353,593 B1    3/2002 Chen et al. ................. 370/216
6,529,599 B1 *  3/2003 Gorshe ................... 379/399.01

OTHER PUBLICATIONS

"Synchronous Optical Network (SONET) Transport Systems: Common Generic Criteria," GR–253–CORE, Issue 2, Dec. 1995, with Revision 2, Jan. 1999; Bellcore, 1999, Mar. 12, 2004.

* cited by examiner

Primary Examiner—Chau Nguyen
Assistant Examiner—Robert W. Wilson
(74) Attorney, Agent, or Firm—Baker Botts L.L.P.

(57) ABSTRACT

A protection method and system for equipment in a network element receives a protection request for an equipment item. A priority of the request and a priority of the equipment item is evaluated relative to all other outstanding protection requests for equipment items in a protection group with the equipment item. A highest priority protection request for a highest priority equipment item is performed.

27 Claims, 4 Drawing Sheets

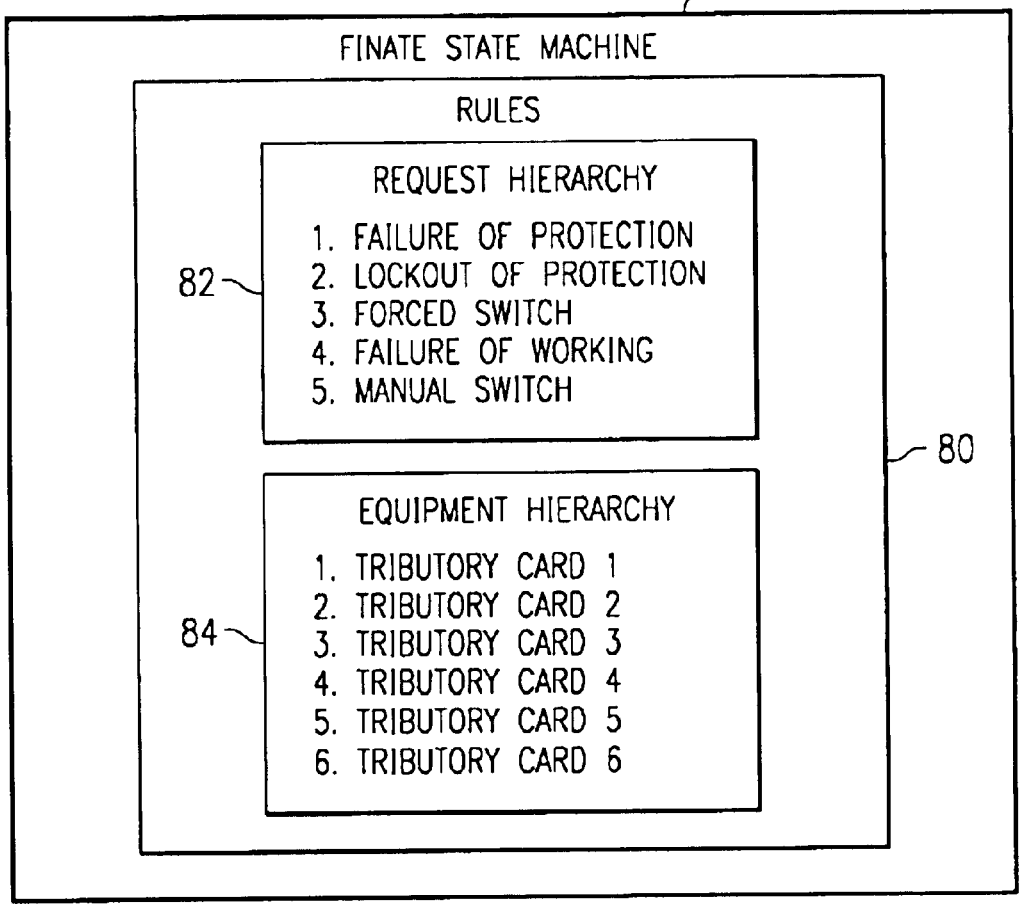

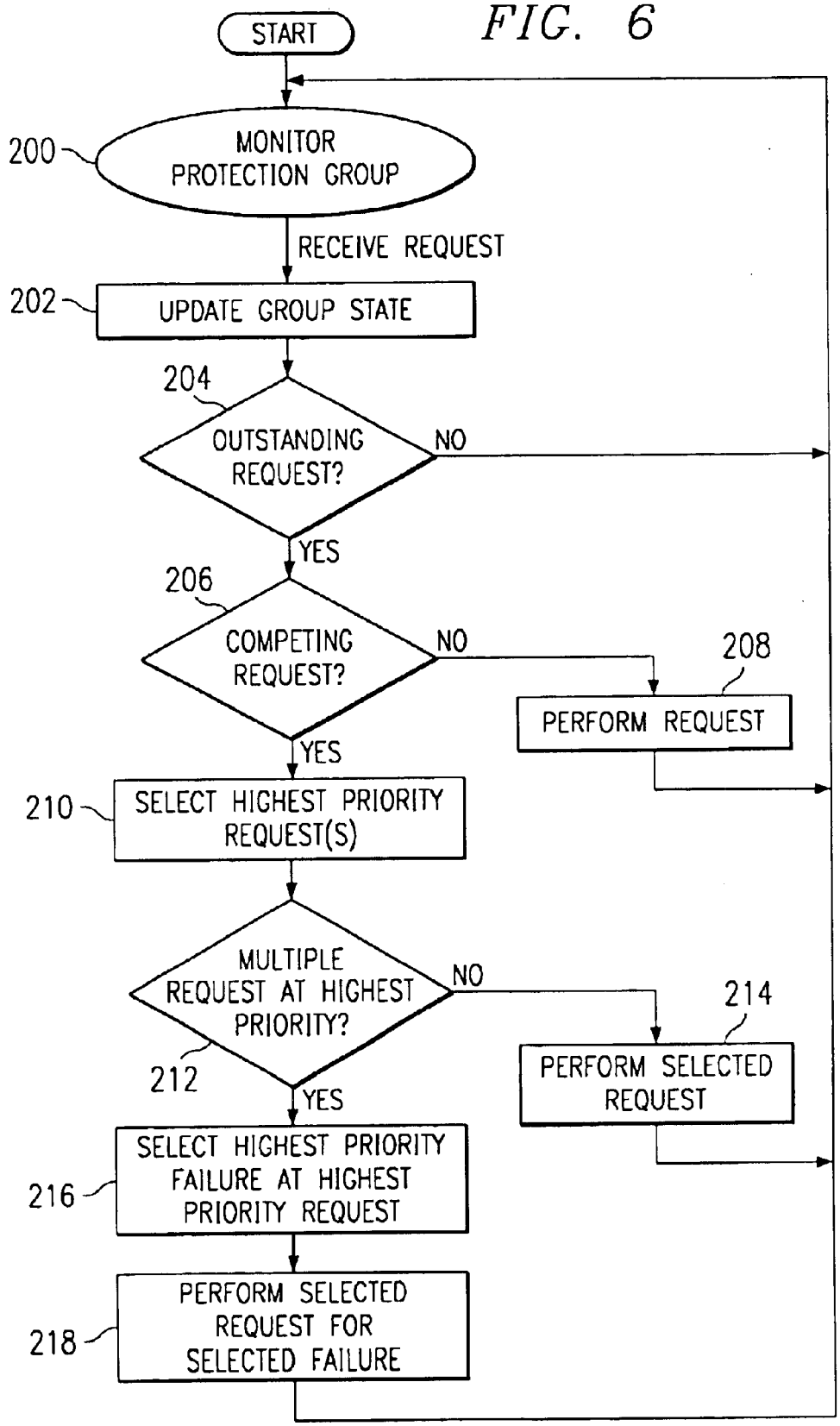

PROTECTION METHOD AND SYSTEM FOR EQUIPMENT IN A NETWORK ELEMENT

TECHNICAL FIELD OF THE INVENTION

This invention relates generally to the field of telecommunications networks, and more particularly, to a protection method and system for equipment in a network element.

BACKGROUND OF THE INVENTION

Telecommunications networks transmit voice and other data between end users. The networks include switch and management nodes for processing and routing traffic in the network and links between the nodes for carrying the traffic. The links are circuit switched or packet switched wireline links, wireless links, or a combination of link types. End users communicate data over telephones, computers, personal digital assistants (PDA) and other similar devices.

Telecommunication nodes include redundant equipment and are connected to redundant to provide fault tolerance and allow continued operation in the event of equipment or link failure. Typically, each transmission link as well as line or switch cards of the nodes are backed up by corresponding links and cards to ensure that all traffic is protected at all parts of the network. This 1+1 protection, however, is expensive to maintain as fully half of the networks capacity is maintained in reserved for protection switching and is not used during normal operation of the network.

To increase network efficiency, 1:N protection architectures have been developed and deployed in telecommunications nodes. In this architecture, a number (N) of cards or other items are protected by a single item. Thus full protection is provided for any single failure. Multiple concurrent failures, however, cannot be completely protected. In the event of multiple concurrent failures, equipment is typically protected based on a failure request priority. Within the priorities, equipment is protected on a first failed basis, which can lead to less important equipment being protected at the expense of later failing, more important equipment.

SUMMARY OF THE INVENTION

The present invention provides a protection method and system for equipment in a network element of a telecommunications network that significantly reduce or eliminate elements problems and disadvantages associated with previous systems and methods. In particular, the present invention prioritizes protection for failed equipment based on both protection request type and failed equipment type.

In accordance with one embodiment of the present invention, a method and system for providing protection switching for equipment in a network element includes receiving a protection request for an equipment item. A priority of the request and a priority of the equipment item is evaluated relative to all other outstanding protection requests for other equipment items in a protection group with the equipment item. A highest priority protection request for a highest priority equipment item is performed.

More specifically, in accordance with a particular embodiment of the present invention, the equipment items in the protection group comprise line interface cards. The line interface cards may each comprise a plurality of DS-1 or other single user connections. The protection request may be an activation request or a deactivation request for an equipment item.

Technical advantages of the present invention include providing an improved method and system for protecting equipment in a network element. In a particular embodiment, a plurality of equipment items are protected by a single item with protection priority being provided based on protection request type and failed equipment type. Accordingly, during multiple concurrent failures of equipment, the most important equipment item at the highest protection request level is protected. This improves network performance and provides for a more deterministic network that can be more fully controlled by network operators.

Another technical advantage of one or more embodiments of the present invention includes providing greater protection switching granularity. In particular, protection switching is provided for DS-1 and/or other cards supporting single connections on an 1:N basis. Thus, low level elements may be partially protected in a network element while higher level elements are fully protected. This allows the majority of traffic to be fully protected while limited protection is provided for individual flows on an efficient basis.

Other technical advantages of the present invention will be readily apparent to one skilled in the art from the following figures, description, and claims.

BRIEF DESCRIPTION OF THE DRAWINGS

For a more complete understanding of the present invention and its advantages, reference is now made to the following description taken in conjunction with the accompanying drawings, wherein like reference numerals represent like parts, in which:

FIG. 2 is a block diagram illustrating details of the finite state machine of FIG. 1 in accordance with one embodiment of the present invention;

FIG. 3 is a block diagram illustrating details of the state table of FIG. 1 in accordance with one embodiment of the present invention;

FIG. 6 is a flow diagram illustrating a method for evaluating protection request for the method of FIG. 5 based on protection request type and equipment type in accordance with one embodiment with the present invention.

DETAILED DESCRIPTION OF THE INVENTION

Figure 1:
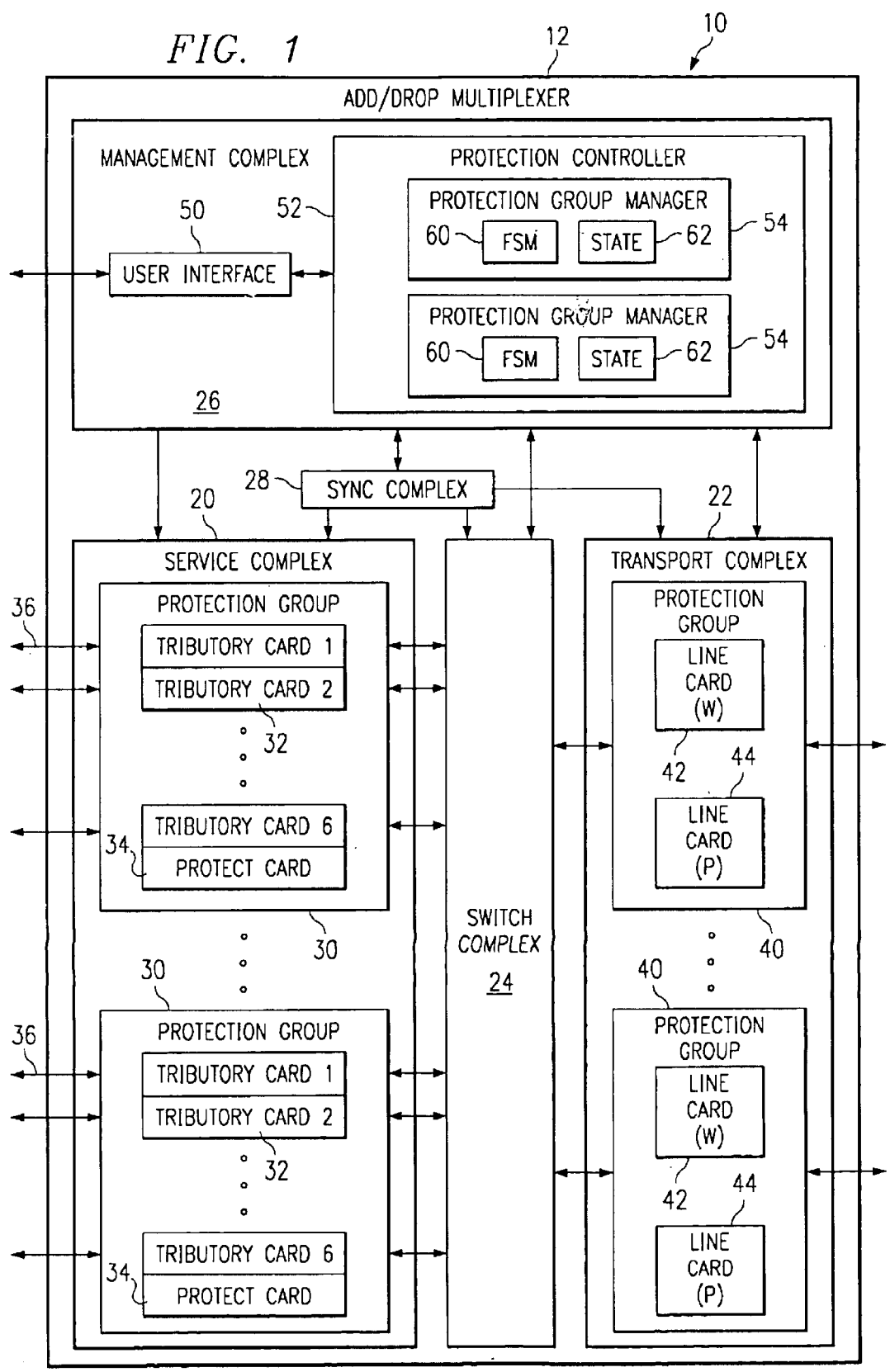
FIG. 1 is a block diagram illustrating a network element for a telecommunications system in accordance with one embodiment of the present invention.

FIG. 1 illustrates a network element 10 for a telecommunications network in accordance with one embodiment of the present invention. The telecommunications network transmits voice, data, or other suitable types of information, and/or a combination of types of information between end users. The telecommunications network may include a public network such as the Internet and the public switched telephone network (PSTN) as well as private networks such as wide area networks (WAN) and local area networks (LAN).

The telecommunications network includes a plurality of network elements interconnected by transmission links. The network elements may comprise a switch, router, add/drop multiplexer, access device or other suitable device capable of directing traffic in the telecommunications network. The transmission links provide the physical interface between the network elements. The physical interfaces are defined by bandwidth of the connecting transmission links which may be DS-1 lines, DS-3 lines, OC-3 lines, OC-12 lines or other suitable bandwidths. Transmission links may comprise optical fiber, cable, twisted wire, or other suitable wireline or wireless links capable of transporting traffic between network elements.

Referring to FIG. 1, the network element 10 is illustrated as a add/drop multiplexer 12 including a service complex 20, a transport complex 22, a switch complex 24, a management complex 26, and a synchronization complex 28. The complexes 20, 22, 24, 26 and 28 are interconnected by one or more buses or backplanes in the add/drop multiplexer 12.

The service complex 20 includes a plurality of 1:N protection groups 30 each defining a set of working tributary cards 32 and a corresponding protect card 34. In a particular embodiment, the 1:N protection group 30 includes six (6) tributary card and a single protect card 34. It will be understood that the number of working tributary cards 32 in the protection group 30 and the number of protect cards may be suitably varied without departing from the scope of the present invention. The protect card 34 is able to protect any one of the working tributary cards 32 in the protection group 30. Thus, the protect card 34 is able to protect each of the working tributary cards 32 and to fully protect any single failure of the cards 32.

The working tributary cards 32 each receive customer input/output (I/O) and perform conversions necessary for processing by the switch complex 24. In one embodiment, each tributary card 34 is a DS-1 card and receives a plurality of DS-1 connections 36. It will be understood that the protection groups 30 may comprise a set of other suitable equipment items and/or the tributary cards 32 may receive other suitable types of single user connections and/or other suitable types of aggregated traffic connections and/or a combination of connection types.

The transport complex 22 includes a plurality of 1+1 protection groups 40. Each protection group 40 includes a working line card 42 and a protection line card 44. Thus, the high capacity line cards 42 are fully protected. In a particular embodiment, the line cards 42 and 44 are OC-3 or OC-12 line cards 42 that are bi-directional and perform optical to electrical (O/E) and electrical to optical (E/O) conversions. In this embodiment, the line cards 42 and 44 also perform overhead construction and insertion.

The switch complex 24 comprises one or more switch fabrics for switching traffic between the service complex 20 and the transport complex 22 and between the cards within the service and transport complexes 20 and 22. In a particular embodiment, the switch complex 24 includes synchronous optical network (SONET) and asynchronous transfer mode (ATM) switch fabrics.

The management complex 26 monitors and controls the status of the service, transport, switch and synchronization complexes 20, 22, 24 and 28. The management complex 26 also provides network management functions, controls protection switching, and maintains provision databases for the add/drop multiplexer 12. The synchronization complex 28 synchronizes the service, transport, switch and management complexes 20, 22, 24 and 26 by providing a stable traceable reference clock.

In one embodiment, the management complex 26 includes a user interface 50 and a protection controller 52. The user interface 50 communicates with network operators to allow local and remote control and provisioning of the add/drop multiplexer 12 by the network operator and to respond to queries for information about the status of the add/drop multiplexer 12. In a particular embodiment, the user interface 50 translates requests received from a network management station (NMS) to a native format of the add/drop multiplexer 12 and forwards the requests to the appropriate complex and/or controller for processing. In this embodiment, the user interface 50 also converts responses and/or messages from the add/drop multiplexer 12 to the native language of the NMS for reporting to the network operator.

The protection controller 52 receives and processes protection requests from the network operator received through the user interface 50 and from the hardware including the service, transport and switch complexes 20, 22 and 24. In response to failure of an equipment item, the protection activation request is automatically generated locally within a complex and forwarded to the protection controller 52, an alarm forwarded to the protection controller 52 for automatic generation of the protection requests or otherwise suitably generated based on the state of the hardware. Protection requests comprise activation requests for activation of protected equipment in case of failed or out of service working equipment or deactivation requests for deactivation of protection equipment in response to return to service of working equipment.

In one embodiment, the protection controller 52 includes a plurality of protection group managers 54. Each protection group manager 54 controls protection requests for a corresponding protection group 30 and/or 40 on the service and transport complexes 20 and 22. The protection group managers 54 each include a finite state machine 60 and a state memory 62. As used herein, the term each means everyone of at least a subset of the identified items. The finite state machine 60 controls activation of protection request for protection switching based on the state of cards 32 and 34 in the protection group 30 and/or the state of cards 42 and 44 in protection group 44. The state memory 62 stores the state of cards 32 and 34 in the protection group 30 and/or the state of cards 42 and 44 in the protection group 40.

The complexes, cards, protection controller 52 and other elements and equipment of the add/drop multiplexer 12 comprise logic stored as software encoded on a computer-readable medium for execution by a general purpose processor or logic stored as instructions in an application specific integrated circuit (ASIC), field programmable gate array (FPGA) or other suitable medium, which may comprise one or more media devices and types. It will be understood that the protection controller 52 may be implemented entirely on the management complex 26 or its functionality distributed within the add/drop multiplexer 12.

FIG. 2 illustrates details of the tributary cards 32 the finite state machine 60 for 1:N protection of the tributary cards 32 in accordance with one embodiment of the present invention. In this embodiment, the finite state machine 60 includes rules 80 specifying the priority of requests and the priority of cards or other suitable equipment items to be protected in the protection group 30. Thus, the finite state machine 60 may be customized for each protection group 30 and/or for protection groups of different equipment types.

Referring to FIG. 2, the rules 80 includes a protection requests hierarchy 82 and an equipment protection hierarchy 84. The requests hierarchy 82 includes an ascending hierarchy of request. In a particular embodiment, the request hierarchy 82 includes a highest priority of failure of protection, followed in order by lockout of protection, forced switch, failure of working and manual switch. In this embodiment, failure of protection is a failure of the protection card 34, lockout of protection is a lockout by the network operator of the protection card 34, forced switch is a high priority manual switch by the network operator, failure of a working is a failure of a working tributary card 32 and manual switch is a low priority manual switch by the network operator. It will be understood that other or different types of requests may be included within the requests hierarchy 82 in that the requests types may be otherwise suitably prioritized.

The equipment hierarchy 84 defines the priority of the working tributary cards 32 in the protection group 30. In a particular embodiment, the tributary cards are prioritized based on a card number such as card 1 to card 6, channel reference number or other suitable reference or identifier. In this embodiment, the tributary cards 32 may be provisioned in order based on their priority. Alternatively, the tributary cards 32 may be provisioned and the protection order later defined in the equipment hierarchy 84.

FIG. 3 illustrates the state memory 62 in accordance with one embodiment of the present invention. In this embodiment, the states of the working and protect tributary cards 32 and 34 are stored in a table 90. The table 90 includes a column for each working tributary card 32 and the protect card 34 and a row for each type of protection activity. For the finite state machine 60 of FIG. 2, the protection activities are forced, lockout, manual and automatic. A forced activity is a high priority network operator initiated activity, a manual activity is a low priority network operation initiated activity, an automatic activity is a an activity generated automatically in response to a hardware or other failure or alarm and a lockout activity is an activity preventing use of a card.

Referring to FIG. 3, a bit is set in each entry 92 of the table 90 indicating the status of the corresponding card for the corresponding activity. In a particular embodiment, the bits are set to zero in the absence of the defined activity and set to 1 during the occurrence of the activity. It will be understood that the states of the working and protect cards 32 and 34 in the protection group 30 may be otherwise suitably stored in the protection controller 52 without departing from the scope of the present invention.

Figure 4:
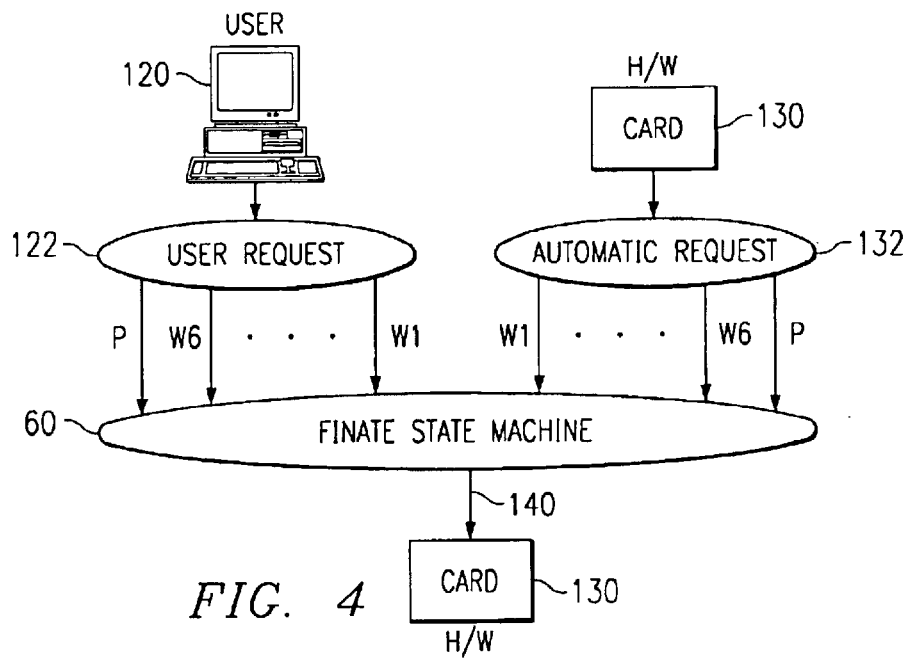
FIG. 4 is a functional diagram illustrating input and output of the finite state machine of FIG. 1 in accordance with one embodiment of the present invention.

FIG. 4 is a functional diagram illustrating input to and output from the finite state machine 60 in accordance with one embodiment of the present invention. In this embodiment, a network operator or other user 120 initiates user protection requests 122 for any of the working tributary card 32 and the protect card 34. The operator requests are received by the user interface 50, translated and passed to the protection controller 52 for evaluation.

The working or protect tributary cards 32 or 34 or other hardware 130 each generate automatic requests 132 in response to card failures, alarm conditions and/or other suitable events and/or conditions of the hardware 130. As used herein, the phrase in response to means performing the identified action directly or indirectly following the identified event. Thus, the action may occur immediately or substantially immediately upon the occurrence of the event or after another necessary or intervening event.

The finite state machine 60 receives the operator requests 122 and the automatic requests 132 and evaluates the requests based on priority of the requests and priority of the equipment for which the requests is made to determine protection activity 140. The protection activity 140 is output by the finite state machine 60 to the hardware 130 for performance by the hardware. In this way, the protection activity is determined based on all of the operator and automatic request 122 and 132 to provide optimized protection for any state of the protection group 30.

Figure 5:
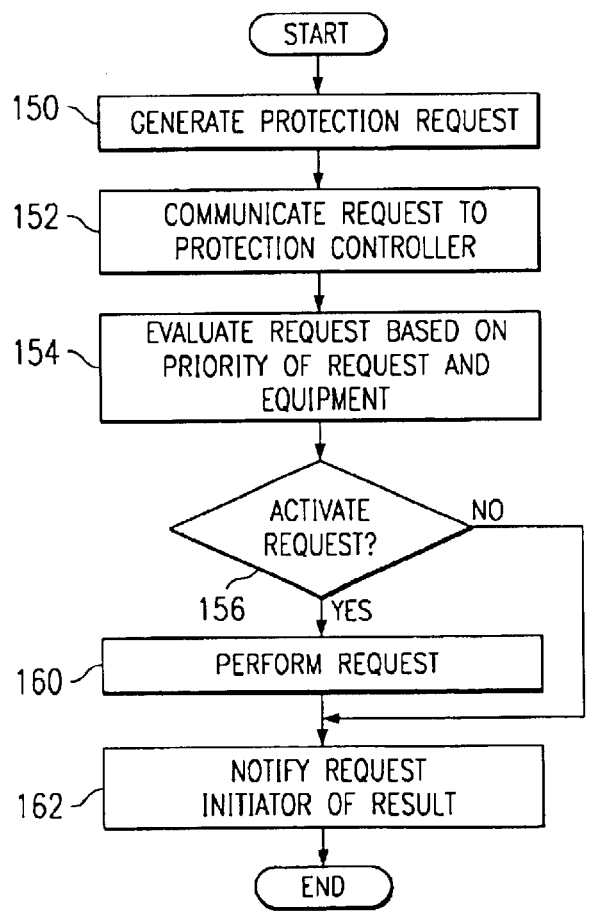
FIG. 5 is a flow diagram illustrating a method for processing protection request, in accordance with one embodiment of the present invention.

FIG. 5 illustrates a method for processing protection request for an 1:N protection group in accordance with one embodiment of the present invention. The method begins at step 150 in which a protection requests is generated. The requests may be generated by a network operator at a NMS or by hardware 130 in response to a failure, alarm condition or other suitable condition of the hardware.

Preceding to step 152, the requests is communicated to the protection controller 52. For operator, or user, initiative request, the request may be translated by the user interface 50 before being passed to the protection controller 52. Similarly, hardware initiated requests may be translated prior to transmission to the protection controller 52 if not in the native language of the controller 52.

At step 154, the request is evaluated based on a priority of the request and a priority of the equipment for which the request is generated. As described in more detail below, the request is evaluated by comparing the priority of the request and of the equipment to the priority of all other requests for the same or other equipment in the protection group 30. Next, at decisional step 156, the requests is activated if the requests comprises the highest priority among outstanding requests or, if more than one request is at the same highest priority level, the request is for the highest priority equipment at that level. Thus, a currently activated, lower priority protection request will be deactivated. If the request is activated, the Yes branch of decisional step 156 leads to step 160 in which the requests is performed. At step 162, the initiator is notified of the action taken, or results of the request.

Returning to decisional step 156, if the requests is not activated, the No branch of decisional step 156 also leads to step 162 in which the initiator is notified of the result. Step 162 leads in the end of the process in which protection switching is provided based on the priority of the requests and the priority of the equipment to optimize protection switching in an 1:N or other suitable protection environment.

FIG. 6 illustrates a method for monitoring an 1:N protection group and evaluating protection requests for the group in accordance with one embodiment of the present invention. The method begins at state 200 in which the protection group 30 is monitored by the finite state machine 60. In response to receipt of a protection request, state 200 transitions to step 202. At step 202, the state memory 62 of the protection group 30 is updated to reflect the request. The requests may be an activation request or a deactivation request.

Proceeding to decisional step 204, the finite state machine 60 determines whether any requests are outstanding. If no requests are outstanding, no further processing is required and the No branch of decisional step 204 returns to the monitor state 200. If one or more protection requests are or remain outstanding, the Yes branch of decisional step 204 leads to decisional step 206.

At decisional step 206, the finite state machine 60 determines whether there are competing protection request for use of the protect card 32. If there is only one outstanding request, the No branch of decisional step 206 leads to step 208 in which the lone outstanding request is performed. Upon performance of the protection request, step 208 returns to monitoring state 200 such that protection status may be reevaluated in response to any further requests.

At decisional step 206, if there are competing requests, the Yes branch of decisional step 206 leads to step 210 in which the outstanding protection request having the highest priority is selected. In one embodiment, the highest priority requests is selected based on the requests hierarchy 82 in which a failure of protection has a higher priority than lockout of protection which has a higher priority than forced switch, which has a higher priority than failure of working, which has a higher priority than manual switch.

Next, at decisional step 212, the finite state machine 60 determines whether there are multiple requests at the highest priority. If only a single requests is of the highest priority, the No branch of decisional step 212 leads to step 214. At step 214, the selected highest priority protection requests is performed. Step 214 returns to monitor state 200 in which the finite state machine 60 continues to monitor the protection group 30 for further request activity.

Returning to decisional step 212, if there are multiple requests at the highest priority, the Yes branch of decisional step 212 leads to step 216 in which the requests for the highest priority equipment among the highest priority request is selected. At step 218, the selected requests is performed for the selected equipment. State 218 returns to state 200 in which the finite state machine 60 continues to monitor the protection group for further protection requests.

In this way, the order of protection down to the request type and the equipment level may be specified by the network operator and carried out by the finite state machine 60. The finite state machine 60 will terminate protection of a low priority request and/or equipment in favor of a higher priority request and/or equipment. In addition, in response to termination of the currently activated requests, the finite state machine 60 will determine the next higher priority request and/or equipment and provide protection for that requests and/or equipment. Thus, protection switching is optimized for the 1:N protection switching environment.

Although the present invention has been described with several embodiments, various changes and modifications may be suggested to one skilled in the art. It is intended that the present invention encompasses such changes and modifications that fall within the scope of the appended claims and their equivalents.

What is claimed is:

1. A computer-implemented method for protecting equipment in a network element, comprising:
   receiving a protection request for a first equipment item, the first equipment item having a first equipment type;
   receiving a protection request for a second equipment item, the second equipment item having a second equipment type;
   determining a higher priority item between the first and second equipment items based on the first and second equipment types; and
   performing the protection request for the higher priority item.

2. The method of claim 1, wherein the equipment items comprise line interface cards.

3. The method of claim 2, wherein line interface cards each comprise a plurality of single user connections.

4. The method of claim 2, wherein the line connection interface cards each comprise only single user connections.

5. The method of claim 2, wherein the line interface cards each comprise the plurality of DS-1 connections.

6. The method of claim 2, further comprising determining the higher priority item based on an identifier of the line interface cards.

7. The method of claim 1, further comprising:
   performing the protection request for the first equipment item in an absence of the protection request for the second equipment item;
   determining the higher priority item in response to receiving the protection requests for the second equipment item; and
   deactivating the protection request for the first equipment item in response to determining the second equipment item is the higher priority item.

8. The method of claim 1, wherein the protection request comprises an activation request, further comprising determining the higher priority item in response to the activation request for the first and second equipment items.

9. The method of claim 1, wherein the request is a first request, further comprising:
   receiving a second request, the second request comprising a deactivation request for a disparate equipment item; and
   determining the higher priority item for the first request in response to the deactivation request.

10. The method of claim 1, further comprising receiving the protection request for at least one of the equipment items from a network operator.

11. The method of claim 1, further comprising receiving the protection request for at least one of the equipment items automatically in response to failure of the equipment item.

12. The method of claim 1, wherein the protection request is a first protection request, further comprising:
   receiving a second protection request for a third equipment item;
   determining a higher priority request between the first and second protection requests;
   determining the higher priority item between the first and second equipment items if the first protection request is the higher priority request; and
   performing the second protection request if it is the higher priority request.

13. A computer-implemented method for providing 1:N protection switching for equipment in a network element, comprising:
   receiving a protection request for an equipment item, wherein the protection request has a request type and where the equipment item has an equipment type;
   evaluating a priority of the request based on the request type and the equipment type relative to all other outstanding protection requests for equipment items in a protection group with the equipment item;
   if a single outstanding protection request has a request type with a highest priority among the outstanding protection requests, performing the protection request with this highest priority; and
   if a group of two or more outstanding protection request have request types of equally high priority, performing the protection request from this group for the highest priority equipment type.

14. The method of claim 13, wherein the equipment items comprise line interface cards.

15. The method of claim 14, wherein the line interface cards each comprise a plurality of single user connections.

16. The method of claim 15, wherein the single user connections comprise DS-1 connections.

17. The method of claim 13, wherein the priority of the equipment items are evaluated based on an identifier of the equipment items.

18. A system for providing protection switching for equipment in a network element, comprising:
an encoded medium;
logic encoded on the medium, the logic operable to receive a protection request for an equipment item, wherein the protection request has a request type and where the equipment item has an equipment type, evaluate a priority of the request based on the request type and the equipment type relative to all other outstanding protection requests for equipment items in a protection group with the equipment item, if a single outstanding protection request has a request type with a highest priority among the outstanding protection requests, perform the protection request with this highest priority, and if a group of two or more outstanding protection request have request types of equally high priority, perform the protection request from this group for the highest priority equipment type.

19. The system of claim 18, wherein the equipment items in the protection group comprise line interface cards.

20. The system of claim 19, wherein the line interface cards each comprise a plurality of single user connections.

21. The system of claim 20, wherein the single user connections comprise DS-1 connections.

22. The system of claim 18, wherein the priority of the equipment items are evaluated based on identifiers of the equipment items.

23. A system for providing protection switching for equipment in a network element, comprising:
means for receiving a protection request for an equipment item, wherein the protection request has a request type and where the equipment item has an equipment type;
means for evaluating a priority of the request based on the request type and the equipment type relative to all other outstanding protection requests for equipment items in a protection group with the equipment item;
if a single outstanding protection request has a request type with a highest priority among the outstanding protection requests, means for performing the protection request with this highest priority; and
if a group of two or more outstanding protection request have request types of equally high priority, means for performing the protection request from this group for the highest priority equipment type.

24. The system of claim 23, wherein the equipment items in the protection group comprise line interface cards.

25. The system of claim 24, wherein the line interface cards each comprise a plurality of single user connections.

26. The system of claim 25, wherein the single user connections comprise a plurality of DS-1 connections.

27. A network element for a telecommunications system; comprising:
a protection group including a plurality of working line interface cards and a protection line interface card;
a protection controller operable to store a state of each working and protection line interface card in the protection group; and
a finite state machine operable to evaluate a priority of a request based on a request type of the request and an equipment type of one working line interface card relative to all other outstanding protection requests for working line interface cards in the protection group with the one working line interface card, if a single outstanding protection request has a request type with a highest priority among the outstanding protection requests, activate the protection request with this highest priority, and if a group of two or more outstanding protection request have request types of equally high priority, activate the protection request from this group for the highest priority equipment type.

* * * * *

UNITED STATES PATENT AND TRADEMARK OFFICE
CERTIFICATE OF CORRECTION

PATENT NO. : 6,906,997 B1
APPLICATION NO. : 09/658165
DATED : June 14, 2005
INVENTOR(S) : Rajan et al.

It is certified that error appears in the above-identified patent and that said Letters Patent is hereby corrected as shown below:

Title Page, Right Column, item 56, Other Publications, Lines 8 and 9, after "Bellcore 1999" delete ", Mar. 12, 2004".
Title Page, (56) Referenced Cited, insert "5,930,232 A  7/1999  Miller".
Column 2, Line 44, after "protection request" delete ",".

Signed and Sealed this

Second Day of January, 2007

JON W. DUDAS
*Director of the United States Patent and Trademark Office*